Patented Oct. 21, 1941

2,259,736

UNITED STATES PATENT OFFICE 2,259,736

METALLIZED ACID POLYAZO DYES

Moses L. Crossley, Plainfield, and Lincoln M. Shafer, Upper Montclair, N. J., assignors to American Cyanamid Company, New York, N. Y., a corporation of Maine No Drawing. Application October 31, 1939, Serial No. 302,134

13 Claims. (Cl. 260—145)

This invention relates to metallized polyazo dyes which show excellent fastness to light and more particularly, polyazo dyes metallized with the metals of the fourth group of the periodic table of elements, especially zirconium and titanium.

This application is in part a continuation of our copending application Serial No. 150,540, filed June 26, 1937, which matured into U. S. Patent No. 2,213,647 on September 3, 1940.

The metallized dyes of the present invention are obtained by metallizing a polyazo dye having a middle component which is a dihydroxy aryl compound capable of combining with two molecules of diazo compounds in positions ortho to the hydroxy groups, at least one of the diazo compounds having a metallizable group such as a hydroxyl or carboxyl group ortho to the azo group and at least one end component containing a solubilizing group. The dyes may be represented by the following general structural formula:

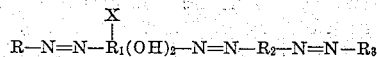

in which R, R₁, R₂ and R₃ are aryl radicals, the two hydroxyl groups on R₁ are ortho to the azo groups, X represents groups such as halogen, alkyl, alkoxy, nitro, carboxyl, sulfonic, hydroxyl and hydrogen. At least one of the radicals R and R₂ has a metallizable group ortho to the azo group connecting the radical to R₁ and at least one of the radicals R and R₃ has a solubilizing group.

In carrying out the present invention, the polyazo dyes are metallized with one or more metals of the fourth group of the periodic table of elements such as zirconium and titanium or combinations with other metals such as titanium-chromium. These combinations of metals react with the dye to produce a product which is not identical with the mixture of the products obtained by treating portions of the dye with separate metals. The metallic combination or complex enters into the dye molecule in some manner which is different from the reaction of a single metal. The precise form of chemical combination has not yet been determined.

The ratio of the metal or metal complex to the dye may vary within wide limits and may depend on the nature of the metal and the number and nature of the metallizable groups in the dye molecule. Where more than one metal is to enter the molecule of the dye, it is, of course, necessary that there be a plurality of pairs of metallizable groups. Such cases correspond to a species under the general formula in which both R and R₂ contain hydroxyl or carboxyl groups ortho to the azo groups.

The present invention is not limited to a particular process of producing the dyes. Normally they will be prepared by coupling the dihydroxy compound with the diazo compound and a diazo azo compound. Of course, the polyazo dyes may be produced by successive couplings of diazo amino compounds which are then rediazotized and further coupled. The end components may be the same or different.

Metallization is effected in the normal manner, for example, by refluxing an aqueous solution of the dye with salts or other suitable compounds of the metals or mixed metals.

In general, the new dyes are dark colored powders which are quite soluble in water and are capable of producing valuable colors of varied tones when dyed from an acid bath on wool, silk, leather and furs. The dyes show good to excellent fastness to light, washing, fulling, acid, alkalies and sea water. The degree of fastness will vary with the particular dyes and with the metals used. The dyes of the class here described, when metallized with zirconium or titanium exhibit excellent fastness to light. Combinations of two or more of these metals also give excellent results and combinations may be made of one or more metals belonging to other groups of the periodic system.

The invention will be described in detail in the following examples but it should be understood that the invention is not limited to the details therein set forth.

*Example 1*

11.05 parts of picramate of soda are suspended in 50 parts of water and diazotized with 6.4 parts hydrochloric acid (real) and 3.66 parts of sodium nitrite keeping the temperature between 25° and 30° C. The excess of acidity is neutralized with a saturated solution of bicarbonate of soda. This diazo solution is then added to a solution containing 5.88 parts of resorcinol in 200 parts of water and 8.5 parts bicarbonate of soda. The mixture is stirred until coupling is complete and 14.5 parts of soda ash added. Then a diazo solution obtained by treating 14.7 parts of amino azo benzene sulfonic acid in 170 parts of water with 3.66 parts of nitrite and 5.6 parts of acid at 60°–63° C. is added and the mixture stirred until coupling is complete. The dye is salted out with sodium chloride after the solution is made slightly acid to Congo red. The resulting dye paste is dissolved in 800 parts of hot water and 12 parts of sodium acetate added. The solution is heated to 60° C. and a solution containing 25 parts of zirconium sulfate added. The entire mixture is then boiled for two hours and salted out with sodium chloride, filtered and dried at 65°–70° C. The product is a dark brown powder, soluble in water, producing a brownish red color. It dyes animal fibers reddish tones of brown of excellent fastness.

The formula for the dye prior to metallization is as follows:

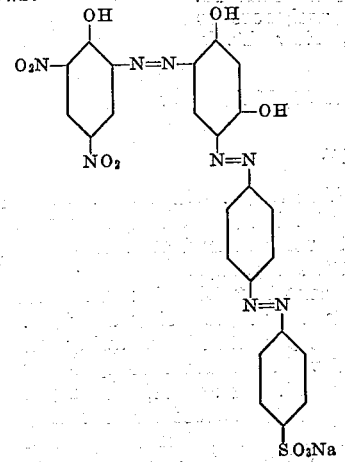

Example 2

160 parts of 1,5-dihydroxynaphthalene is suspended in 2500 parts of water and 400 parts of soda ash are added. The solution is cooled with ice to 5°–10° C. and then mixed with the diazo product obtained from 189 parts of 2-aminophenol-4-sulfonic acid. The mixture is stirred until coupling is complete. Then the diazo compound obtained from 307 parts of the dye produced by coupling p-aminosalicylic acid with alpha naphthylamine in acid solution is added. Sufficient sodium carbonate to have the reaction alkaline throughout the coupling is added. Then the mixture is stirred until the second coupling is complete. The reaction must be alkaline throughout the coupling. The mixture is then made acid to Congo and the dye salted out with sodium chloride. The dye is filtered and the paste suspended in 6000 parts of water and treated with one mole of titanium nitrate, then the mixture is boiled for several hours. The resulting dye is then salted out with sodium chloride. It is soluble in water and dyes animal fibers black. Other metals mentioned in the specifications may be substituted for tin and similar metallized products obtained.

The formula for the dye prior to metallization is as follows:

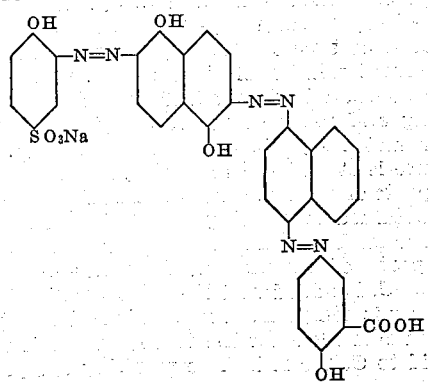

Example 3

Dissolve one molecular weight of the dye obtained by coupling resorcinol first with o-diazo phenol-4-sulfonic acid and then with diazo azo xylene sulfonic acid in about ten times its weight of water. Add 1½ molecular equivalents of sodium acetate and a similar equivalent of titanium sulfate. Adjust the pH to 4 and boil for several hours. Salt out the metallized dye with sodium chloride, filter, dry at about 70° C. The resulting product is a dark powder producing neutral tones of brown of excellent fastness.

The formula for the dye prior to metallization is as follows:

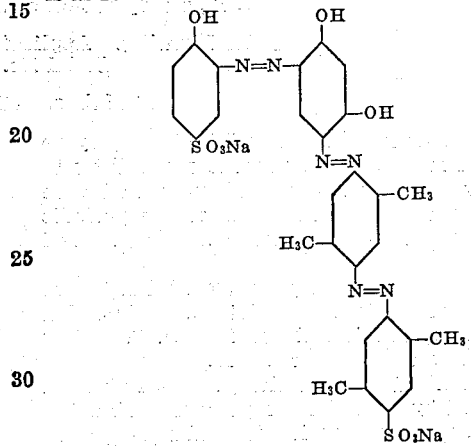

Example 4

11.05 parts of picramate of soda are suspended in 50 parts of water and diazotized with 6.4 parts hydrochloric acid (real) and 3.66 parts of sodium nitrite keeping the temperature between 25° and 30° C. The excess of acidity is neutralized with a saturated solution of bicarbonate of soda. This diazo solution is then added to a solution containing 5.88 parts of resorcinol in 200 parts of water and 8.5 parts of bicarbonate of soda. The mixture is stirred until coupling is complete and 14.5 parts of soda ash added. Then a diazo solution obtained by treating 14.7 parts of amino azo benzene sulfonic acid in 170 parts of water with 3.66 parts of nitrite and 5.6 parts of hydrochloric acid at 60°–63° C. is added and the mixture stirred until coupling is complete. The dye is salted out with sodium chloride after the solution is made slightly acid to Congo red. One mole equivalent of this dye is dissolved in 2000 parts of water and made slightly acid to Congo red. Two mole equivalent of sodium acetate is added and followed by 430 parts of zirconium nitrate dissolved in water. The solution is boiled for three hours and then treated with 10 parts of salt per 100 parts by volume and made slightly acid to Congo red. The dye is filtered and dried. It is a brown powder and dyes animal fibers a reddish brown tone.

The formula for the dye prior to metallization is as follows:

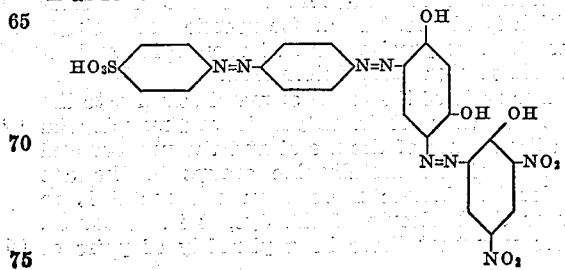

Example 5

154 parts of p-nitro-o-amino-phenol are dissolved in 200 parts of water and diazotized with the addition of 30 parts of 36% hydrochloric acid and 69 parts of sodium nitrite at 10° C. and cooled to 0°–5° C.

160 parts of soda ash are added to the dye produced by coupling 277 parts of amino azo benzene to 194 parts of hexyl resorcinol. The nitro amino phenol diazo is added to this dye and coupling is allowed to stir over night. The dye is precipitated by addition of 15 parts of sodium chloride per 100 parts of volume and the dyeing is filtered.

One mole equivalent of this dye is dissolved in 2000 parts of water and made slightly acid to Congo red. Two mole equivalents of sodium acetate is added and followed by 430 parts of zirconium nitrate dissolved in water. The solution is boiled for 3 hours and then treated with 10 parts of salt per 100 parts by volume and made slightly acid to Congo red. The dye is filtered and dried. It is a brown powder and dyes animal fibres a reddish brown tone.

The formula for the dye prior to metallization is as follows:

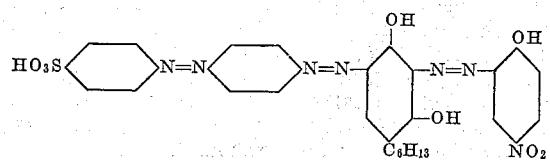

Example 6

The diazo equivalent to 27.7 parts of real amino azo benzene para sulfonic acid dissolved in 500 cc. of solution is coupled to 19.4 parts of hexyl resorcinol at 0°–5° C. in the presence of 50 parts of 20% sodium acetate solution. 22.1 parts of sodium picramate are dissolved in 400 cc. of water and heated until a solution is obtained. 30 parts of 36% hydrochloric acid are added and the slurry is cooled to 25° C. At 25°–30° C. it is diazotized with 6.9 parts of sodium nitrite dissolved in a little water. After 45 minutes the diazotization is complete and the slurry is cooled to 0°–5°.

16 parts of soda ash are added to the dye and the diazo picramic acid is added and the coupling allowed to stir over night. The pH is then adjusted to 6. A very faint trace of red shows on methyl red yellow and it is negative to brilliant yellow paper. The dye produced is filtered without the addition of salt.

One mole equivalent of this dye is dissolved in 2000 parts of water and made slightly acid to Congo red.

Two mole equivalent of sodium acetate is added and followed by 430 parts of zirconium nitrate dissolved in water. The solution is boiled for three hours and then treated with 10 parts of salt per 100 parts by volume and made slightly acid to Congo red. The dye is filtered and dried. It is a brown powder and dyes animal fibers a reddish brown tone.

The dye prior to metallization has the following formula:

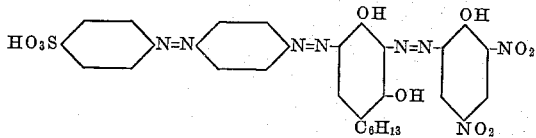

Example 7

22.1 parts of sodium picramate are dissolved in 400 parts of water and stirred to complete solution, then 12.6 parts of hydrochloric acid, 100%, are added. The mixture is cooled to 30° C. and diazotized with the addition of 6.9 parts of sodium nitrite dissolved in water. 34.2 parts of chromotropic acid are dissolved in 400 parts of water with the addition of 9.4 parts of sodium bicarbonate. This solution is added to the picramic acid diazo and allowed to stir overnight. The diazo from 27.7 parts of amino azo benzene is added to this monazo dye. 8 parts of magnesium oxide are added and the coupling is stirred for four or five hours. 600 parts of salt are added and hydrochloric acid is added until there is a faint but permanent test on Congo red paper. It is filtered after it had been stirred for several hours to allow complete precipitation.

One mole equivalent of this dye is dissolved in 2000 parts of water and made slightly acid to Congo red. Two mole equivalents of sodium acetate are added and followed by 430 parts of zirconium nitrate dissolved in water. The solution is boiled for three hours and then treated with 10 parts of salt per 100 parts by volume and made slightly acid to Congo red. The dye is filtered and dried. It is a brown powder and dyes animal fibres a brown tone.

The formula for the dye prior to neutralization is as follows:

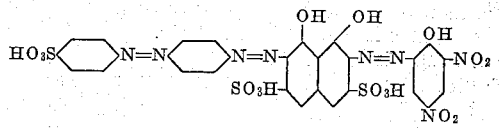

Example 8

One mole equivalent of the dye having the following formula:

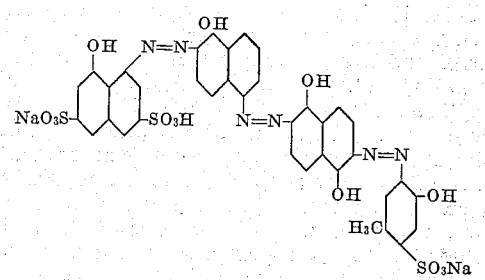

is dissolved in 2000 parts of water and made slightly acid to Congo red. Two mole equivalents of sodium acetate are added and followed by one-half mole equivalent of each titanium sulfate and chromium sulfate. The solution is boiled for four hours and then treated with 10 parts of salt per 100 parts of solution by volume and made slightly acid to Congo red. The dye is filtered and dried. It is a brown powder and dyes animal fibres a reddish brown tone.

Example 9

The dye of Example 8 metallized with zirconium and copper produces a complex brown dye and dyes animal fibres a reddish tone.

The unmetallized dye compounds described in the present application wherein the middle component is hexylresorcinol are new chemical compounds and are not claimed as a part of the present invention which is limited to the fourth group of the periodic table of elements.

What we claim is:

1. Metallized azo dyes having the following formula:

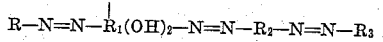

in which R, $R_1$, $R_2$ and $R_3$ are aryl radicals, the hydroxyl groups on $R_1$ are ortho to the azo groups and X represents a member of the group consisting of halogen, alkyl, alkoxy, nitro, carboxyl, sulfonic, hydroxyl and hydrogen, at least one of the radicals R and $R_2$ have a metallizable group ortho to the azo group connecting the radical to $R_1$ and at least one of the radicals R and $R_3$ has a solubilizing group, and the dye being metallized with at least one of the metals included in the group consisting of the fourth group of elements in the periodic table.

2. Metallized azo dyes, the azo dye component of which has the following formula:

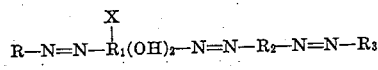

in which $R_1$ is a radical of the benzene series and R, $R_2$ and $R_3$ are aryl radicals, the hydroxyl groups on $R_1$ being ortho to the two azo groups and X represents a member of the group consisting of halogen, alkyl, alkoxy, nitro, carboxyl, sulfonic, hydroxyl, and hydrogen, at least one of the radicals R and $R_2$ have a metallizable group ortho to the azo group connecting the radical with the resorcinol radical and at least one of the radicals R and $R_3$ has a solubilizing group, and the dye being metallized with at least one of the metals included in the group consisting of fourth group of elements in the periodic table.

3. Metallized azo dyes, the azo dye component of which has the following formula:

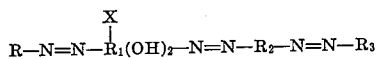

in which the radicals R, $R_2$ and $R_3$ are aryl radicals, $R_1$ is a radical of the naphthalene series having the hydroxyl groups ortho to the azo groups and X represents a member of the group consisting of halogen, alkyl, alkoxy, nitro, carboxyl, sulfonic, hydroxyl, and hydrogen, at least one of the radicals R and $R_2$ having a metallizable group ortho to the azo group connecting the radical $R_1$, and at least one of the radicals R and $R_3$ containing a solubilizing group, and the dye being metallized with at least one of the metals included in the group consisting of fourth group of elements in the periodic table.

4. A metallized azo dye according to claim 1 in which both R and $R_2$ contain metallizable groups ortho to the azo groups connecting these radicals with $R_1$.

5. A metallized azo dye according to claim 1 in which $R_3$ is an arylazoaryl radical.

6. A metallized azo dye according to claim 1 in which $R_3$ is an aryl radical free from azo groups except the one connecting to $R_2$.

7. A metallized azo dye according to claim 2 in which R is phenol with the hydroxy group ortho to the azo group and $R_2$ is an azobenzene radical.

8. A metallized azo dye according to claim 2 in which R is

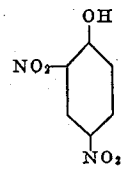

9. A metallized trisazo dye of the general formula:

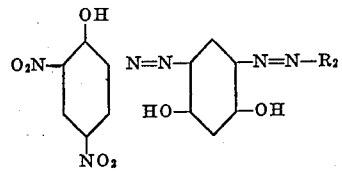

in which $R_2$ represents a radical of a 4'-sulfonic acid azobenzene, the dye being metallized with at least one metal included in the group consisting of elements of the fourth group of the periodic table.

10. A metallized azo dye according to claim 1 in which both R and $R_2$ contain metallizable groups ortho to the azo groups connecting these radicals to $R_1$ and the dye metallized with a mixture of at least one of the metals included in the group consisting of elements in the fourth group of the periodic table, with at least one of the metals included in the group consisting of fourth group of elements in the periodic table.

11. A complex zirconium copper compound of the azo dye having the following formula:

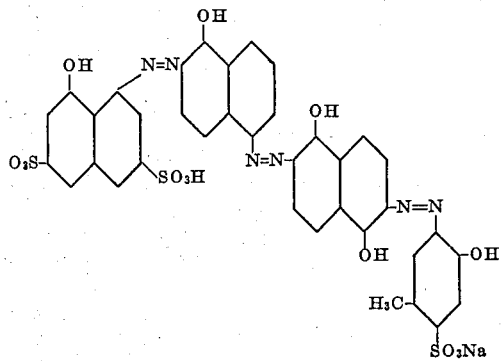

12. A metallized azo dye according to claim 1 in which

is hexylresorcinol.

13. A metallized azo dye according to claim 1 in which

is chromotropic acid.

MOSES L. CROSSLEY.
LINCOLN M. SHAFER.

CERTIFICATE OF CORRECTION.

Patent No. 2,259,736.  October 21, 1941.

MOSES L. CROSSLEY, ET AL.

It is hereby certified that error appears in the printed specification of the above numbered patent requiring correction as follows: Page 4, second column, line 41, claim 11, in the extreme left-hand portion of the formula, for "$O_3S$" read --$NaO_3S$--; and that the said Letters Patent should be read with this correction therein that the same may conform to the record of the case in the Patent Office.

Signed and sealed this 18th day of November, A. D. 1941.

Henry Van Arsdale,
Acting Commissioner of Patents.

(Seal)